US009076288B2

(12) United States Patent
Rosenheimer

(10) Patent No.: US 9,076,288 B2
(45) Date of Patent: Jul. 7, 2015

(54) METHODS DEVICES APPARATUS AND SYSTEMS FOR EXTENDING BROADENING AND PROMOTING GAMING PARTICIPATION

(75) Inventor: Amir Rosenheimer, Petach Tikva (IL)

(73) Assignee: PAYMAX LTD., Petach Tikva (IL)

( * ) Notice: Subject to any disclaimer, the term of this patent is extended or adjusted under 35 U.S.C. 154(b) by 268 days.

(21) Appl. No.: 13/490,506

(22) Filed: Jun. 7, 2012

(65) Prior Publication Data

US 2013/0331165 A1 Dec. 12, 2013

(51) Int. Cl.
*G07F 17/32* (2006.01)
*G06Q 30/02* (2012.01)

(52) U.S. Cl.
CPC ............ *G07F 17/3223* (2013.01); *G06Q 30/02* (2013.01); *G07F 17/323* (2013.01)

(58) Field of Classification Search
CPC ............ G07F 17/3237; G07F 17/3239; G07F 17/3248; G07F 17/3255
USPC ...................................... 463/17, 42
See application file for complete search history.

(56) References Cited

U.S. PATENT DOCUMENTS

| 6,280,325 | B1* | 8/2001 | Fisk ................................. 463/19 |
| 2002/0068631 | A1* | 6/2002 | Raverdy et al. ................. 463/42 |
| 2005/0043086 | A1* | 2/2005 | Schneider ........................ 463/25 |
| 2006/0258422 | A1* | 11/2006 | Walker et al. ..................... 463/7 |
| 2008/0146346 | A1* | 6/2008 | Hardy et al. .................... 463/42 |
| 2012/0122590 | A1* | 5/2012 | Nguyen .......................... 463/42 |

* cited by examiner

*Primary Examiner* — Kevin Y Kim
(74) *Attorney, Agent, or Firm* — Vladimir Sherman; Professional Patent Solutions

(57) ABSTRACT

Disclosed is a game participation extension system for extending, broadening and promoting gaming participation, in a regularly recurring game, including: a game instance tracking module to track one or more instances of the regularly recurring game, a virtual game generator to substantially in real-time generate virtual representations mirroring game events from the tracked game instance and to transmit the virtual representations to a computing appliance of a prospective player, and a virtual wager module to accept virtual wagers made by a prospective player through their respective computing appliance.

20 Claims, 7 Drawing Sheets

METHODS DEVICES APPARATUS AND SYSTEMS FOR EXTENDING BROADENING AND PROMOTING GAMING PARTICIPATION

FIELD OF THE INVENTION

The present invention relates generally to the fields of communication and promotions. More specifically, the present invention relates to methods, devices, apparatus and systems for extending, broadening and promoting gaming participation.

BACKGROUND

The first recorded signs of a lottery are keno slips from the Chinese Han Dynasty between 205 and 187 B.C. These lotteries are believed to have helped to finance major government projects like the Great Wall of China. From the Chinese "The Book of Songs" (second millennium B.C.) comes a reference to a game of chance as "the drawing of wood", which in context appears to describe the drawing of lots. From the Celtic era, the Cornish words "teulel pren" translates into "to throw wood" and means "to draw lots". The Iliad of Homer refers to lots being placed into Agamemnon's helmet to determine who would fight Hector.

The first known European lotteries were held during the Roman Empire, mainly as an amusement at dinner parties. Each guest would receive a ticket, and prizes would often consist of fancy items such as dinnerware. Every ticket holder would be assured of winning something. This type of lottery, however, was no more than the distribution of gifts by wealthy noblemen during the Saturnalian revelries. The earliest records of a lottery offering tickets for sale is the lottery organized by Roman Emperor Augustus Caesar. The funds were for repairs in the City of Rome, and the winners were given prizes in the form of articles of unequal value.

The first recorded lotteries to offer tickets for sale with prizes in the form of money were held in the Low Countries in the 15th century. Various towns held public lotteries to raise money for town fortifications, and to help the poor. The town records of Ghent, Utrecht, and Bruges indicate that lotteries may be even older. A record dated May 9, 1445 at L'Ecluse refers to raising funds to build walls and town fortifications, with a lottery of 4,304 tickets and total prize money of 1737 florins. In the 17th century it was quite usual in the Netherlands to organize lotteries to collect money for the poor or in order to raise funds for all kinds of public usages. The lotteries proved very popular and were hailed as a painless form of taxation. The Dutch state-owned Staatsloterij is the oldest running lottery.

An English lottery, authorized by King James I in 1612, granted the Virginia Company of London the right to raise money to help establish settlers in the first permanent English colony at Jamestown, Va. Lotteries in colonial America played a significant part in the financing of both private and public ventures. It has been recorded that more than 200 lotteries were sanctioned between 1744 and 1776, and played a major role in financing roads, libraries, churches, colleges, canals, bridges, etc. In the 1740s, the foundation of Princeton and Columbia Universities was financed by lotteries, as was the University of Pennsylvania by the Academy Lottery in 1755.

During the French and Indian Wars, several colonies used lotteries to help finance fortifications and their local militia. In May 1758, the State of Massachusetts raised money with a lottery for the "Expedition against Canada." Benjamin Franklin organized a lottery to raise money to purchase cannons for the defense of Philadelphia. At the outset of the Revolutionary War, the Continental Congress used lotteries to raise money to support the Colonial Army. Alexander Hamilton wrote that lotteries should be kept simple, and that "Everybody . . . will be willing to hazard a trifling sum for the chance of considerable gain . . . and would prefer a small chance of winning a great deal to a great chance of winning little."

At the end of the Revolutionary War the various states had to resort to lotteries to raise funds for numerous public projects. For many years these lotteries were highly successful and contributed to the nation's rapid growth. The lotteries were used for such diverse projects as the Pennsylvania Schuylkill—Susquehanna Canal (lottery in May 1795), and Harvard College (lottery in March 1806). Many American churches raised building funds through state authorized private lotteries.

The numbers game operated out of "Policy shops", where bettors choose numbers, were in the U.S. prior to 1860. In 1875, a report of a select committee of the New York State Assembly stated that "the lowest, meanest, worst form . . . [that] gambling takes in the city of New York, is what is known as policy playing." The game was also popular in Italian neighborhoods known as the Italian lottery, and it was known in Cuban communities as bolita ("little ball").

On Mar. 12, 1964, New Hampshire became the first U.S. state to sell lottery tickets in the modern era. Since then, numerous others U.S. and foreign states are operating lotteries.

It is in the interest of every lottery operator to maximize player participation in each and every lottery instance. Various promotion programs and techniques have been implemented to that end. However, there remains a need for improved methods, techniques and systems for extending and promoting player participation in each game instance.

SUMMARY OF THE INVENTION

The present invention includes methods, devices, apparatus and systems for extending, broadening and promoting gaming participation. According to some embodiments, there may be provided a game participation extension system (GPES) for extending, broadening and promoting gaming participation in a regularly recurring game (RRG), such as a lottery, by: (1) tracking one or more instances of the game, (2) substantially in real-time rendering on a prospective player's computing appliance virtual representations mirroring game events from the tracked game instance, and (3) substantially in real-time accepting virtual wagers not backed by actual monetary funds, made by the prospective player through the computing appliance. The computing appliance may serve large amount of players simultaneously.

According to some embodiments, prospective players may further be assigned or receive credits associated with one or more game instances and/or the prospective players results in a game instance and more.

According to further embodiments, a winner of a virtual wager may be awarded a real prize, which real prize may have actual monetary value and/or may convey some rights, privileges or benefits associated with future game instances or can be other valuable good or virtual goods. According to yet further embodiments, some or all of a prospective player's virtual gaming history may be stored, for example in association with the prospective player's basic profile. A gaming promotions module, integral or otherwise associated with the system, may issue an offer to the prospective player to participate financially, with real funds, in an instance of a RRG.

According to further embodiments, timing of an offer issued to a prospective player may be based on the virtual gaming history of the prospective player and/or based on other parameters of the prospective player's profile. According to further embodiments, the issued offer may be for participation (virtual or real) in an instance of a RRG different from that of the virtual game in which the prospective player was engaged.

The solution may provide an effective sales promotion tool, which may be considered significantly less expensive than traditional advertisement and other promotion tools, and may result in much higher awareness.

Accordingly, according to some embodiments the step of accepting virtual wagers not backed by actual monetary funds, made by the prospective player through the computing appliance, may be replaced with similar or parallel interactive steps such as the prospective player initiating/playing a secondary interactive game, participating in a mock instance or otherwise participating, activating or responding to the mirrored game.

According to some embodiments a GPES may include a game instance tracking module, a prospective player interface module to relay the virtual representations mirroring game events to a prospective player. Additional blocks/elements may include: virtual gaming history memory to store and assess information associated with specific prospective players, regulation logic to confirm/verify that relevant laws or regulations associated with game events are complied with, compulsive identification module to trigger a warning if a prospective player is displaying suspected compulsive behavior associated with game events and more.

According to some embodiments, a game instance tracking module may receive information from a game (for example, a broadcast, via the internet, directly or otherwise). The game instance tracking module may be notified of an expected upcoming game instance notifier, may poll periodically to check if a game has initiated, may receive a trigger prior to initialization of a game or otherwise. The game instance may be relayed to a game event representation generator which may embed additional content within the game instance such as promotional content, aesthetic content, virtual wager information and more to produce a mirrored game event. The mirrored game event may be relayed to one or more prospective players via the prospective player interface module which may adapt/transfer the mirrored game event to a signal suitable to transferring to a prospective player.

According to some embodiments, a prospective player may correspond with a GPES system via the prospective player interface module. The prospective player may submit a virtual wager which may be stored in the virtual wager processing module. When a game instance is concluded the GPES may receive or identify one or more winners and may notify the winner via the prize notification module.

According to some embodiments, a promotion logic module may interact with a virtual gaming history memory, an external statistical analytics server and more to determine which predefined promotional logic is to be sent to which prospective player. The promotion logic module may signal an internal or external notification advertisement server to relay a promotional message to a prospective player. The promotion logic module may relay a message to a prospective player via the prospective player interface module.

According to some embodiments, a promotion logic module may receive information associated with effectiveness of previous promotion, message or promotion and/or may track statistics relating to the number or percentage of prospective users receiving promotions who become actual players, thereby determining or estimating a conversion efficiency of a given promotion or promotion type. The promotion logic module may thereby send current promotions based also on conversion efficiency of previous promotions.

According to some embodiments, a prospective player application may be stored on or accessed by a prospective player. The application may support and enable access to a GPES, receiving of mirrored game events substantially in real-time, receiving promotional messages and submitting virtual wagers, interacting with the GPES and more.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
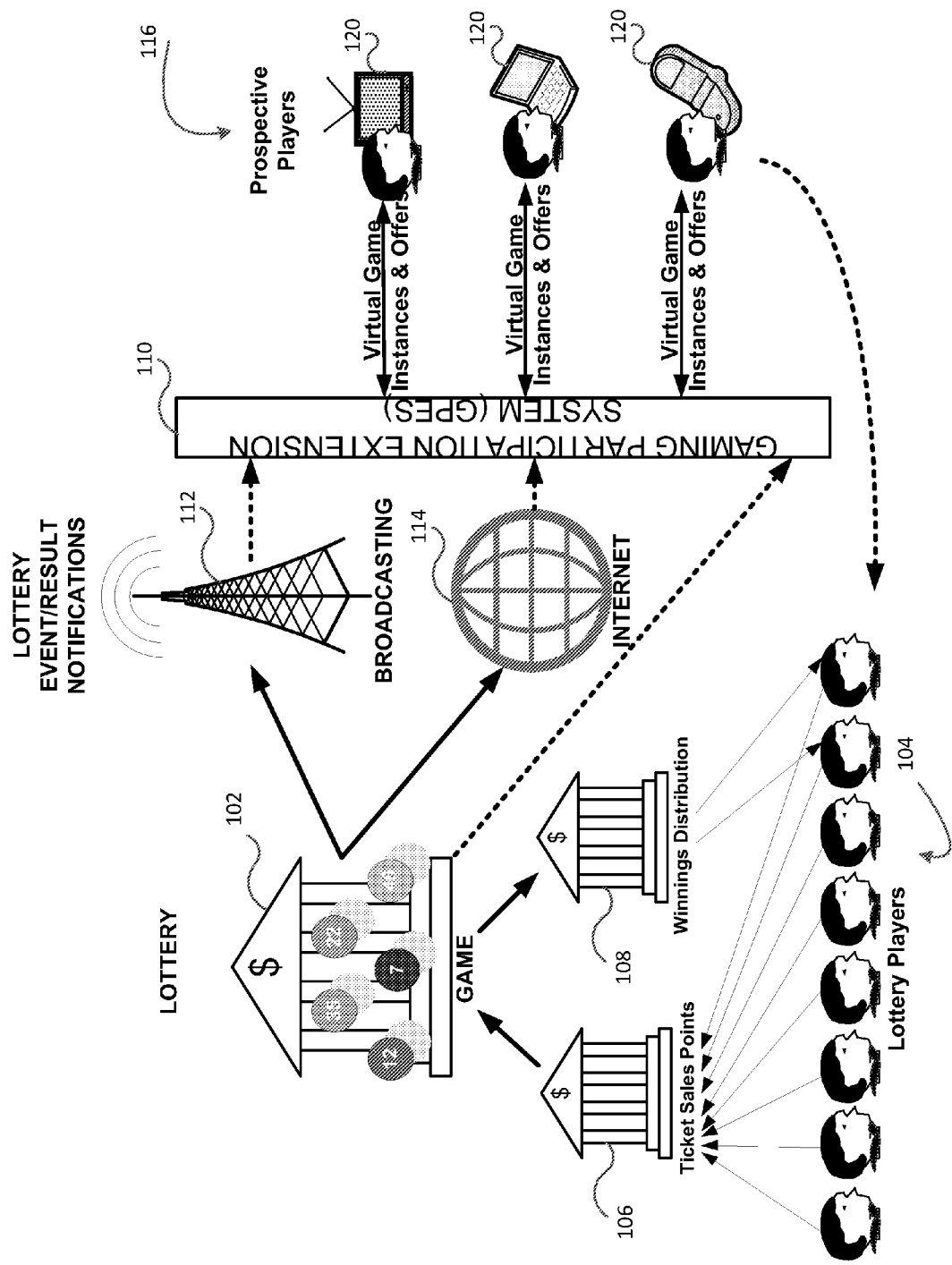
FIG. 1 shows a symbolic representation of an exemplary relationship between a RRG and a GPES according to embodiments of present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, devices, apparatus and systems for extending, broadening and promoting gaming participation. According to some embodiments, there may be provided a GPES for extending, broadening and promoting gaming participation in a RRG, such as a lottery, by: (1) tracking one or more instances of the game, (2) substantially in real-time rendering on a prospective player's computing appliance virtual representations mirroring game events from the tracked game instance, and (3) substantially in real-time accepting virtual wagers not backed by actual monetary funds, made by the prospective player through the computing appliance. The computing appliance may serve large amount of players simultaneously According to some embodiments, prospective players may further be assigned or receive credits associated with one or more game instances and/or the prospective players results in a game instance and more.

According to further embodiments, a winner of a virtual wager may be awarded a real prize, which real prize may have actual monetary value and/or may convey some rights, privileges or benefits associated with future game instances or can be other valuable good or virtual goods. According to yet further embodiments, some or all of a prospective player's virtual gaming history may be stored, for example in association with the prospective player's basic profile. A gaming promotions module, integral or otherwise associated with the system, may issue an offer to the prospective player to participate financially, with real funds, in an instance of a RRG. According to further embodiments, timing of an offer issued to a prospective player may be based on the virtual gaming history of the prospective player and/or based on other parameters of the prospective player's profile. According to further embodiments, the issued offer may be for participation (virtual or real) in an instance of a RRG different from that of the virtual game in which the prospective player was engaged.

Accordingly, according to some embodiments the step of accepting virtual wagers not backed by actual monetary funds, made by the prospective player through the computing appliance, may be replaced with similar or parallel interactive steps such as the prospective player initiating/playing a secondary interactive game, participating in a mock instance or otherwise participating, activating or responding to the mirrored game.

The solution may provide an effective sales promotion tool, which may be considered significantly less expensive than traditional advertisement and other promotion tools, and may result in much higher awareness.

According to some embodiments a GPES may include a game instance tracking module, a prospective player interface module to relay the virtual representations mirroring game events to a prospective player. Additional blocks/elements may include: virtual gaming history memory to store and assess information associated with specific prospective players, regulation logic to confirm/verify that relevant laws or regulations associated with game events are complied with, compulsive identification module to trigger a warning if a prospective player is displaying suspected compulsive behavior associated with game events and more.

According to some embodiments, a game instance tracking module may receive information from a game (for example, a broadcast, via the internet, directly or otherwise). The game instance tracking module may be notified of an expected upcoming game instance notifier, may poll periodically to check if a game has initiated, may receive a trigger prior to initialization of a game or otherwise. The game instance may be relayed to a game event representation generator which may embed additional content within the game instance such as promotional content, aesthetic content, virtual wager information and more to produce a mirrored game event. The mirrored game event may be relayed to one or more prospective players via the prospective player interface module which may adapt/transfer the mirrored game event to a signal suitable to transferring to a prospective player.

According to some embodiments, a prospective player may correspond with a GPES via the prospective player interface module. The prospective player may submit a virtual wager which may be stored in the virtual wager processing module. When a game instance is concluded the GPES may receive or identify one or more winners and may notify the winner via the prize notification module.

According to some embodiments, a promotion logic module may interact with a virtual gaming history memory, an external statistical analytics server and more to determine which predefined promotional logic is to be sent to which prospective player. The promotion logic module may signal an internal or external notification advertisement server to relay a promotional message to a prospective player. The promotion logic module may relay a message to a prospective player via the prospective player interface module.

According to some embodiments, a promotion logic module may receive information associated with effectiveness of previous promotion, message or promotion and/or may track statistics relating to the number or percentage of prospective users receiving promotions who become actual players, thereby determining or estimating a conversion efficiency of a given promotion or promotion type. The promotion logic module may thereby send current promotions based also on conversion efficiency of previous promotions.

According to some embodiments, a prospective player application may be stored on or accessed by a prospective player. The application may support and enable access to a GPES, receiving of mirrored game events substantially in real-time, receiving promotional messages and submitting virtual wagers, interacting with the GPES and more.

According to some embodiment, a GPES for extending, broadening and promoting gaming participation, in a RRG, may include: a game instance tracking module to track one or more instances of the RRG, a virtual game generator to substantially in real-time generate virtual representations mirroring game events from the tracked game instance and to transmit the virtual representations to a computing appliance of a prospective player, and a virtual wager module to accept virtual wagers made by a prospective player through their respective computing appliance.

According to some embodiments, a GPES may include virtual wager module which may monitor that a prospective player is participating while an instance of the RRG is active.

According to some embodiments, a GPES system may include a promotion logic module which may detect that a notification state occurs and initiate a predefined notification which may be sent to one or more computing appliances. The notification state may be associated with identification of a winner of a game and the predefined notification may be sent to the winner of a game and one or more prospective players. Furthermore, the notification state may be associated with the virtual gaming history of one or more prospective players and/or the notification state may be associated with the one or more instances of the RRG(s).

According to some embodiments, a predefined notification may include: an invitation to buy/obtain a real free virtual ticket, an invitation to buy a real ticket, confirmation of a received message from a prospective user at the GPES, a free virtual ticket, a free real ticket, confirmation of credit achieved by a prospective user, confirmation of registration process, reward resulting in achieved credit, reward resulting in consistent playing, confirmation of use of an application, confirmation of use of a social game.media and more.

According to some embodiments, virtual credit may be stored in the virtual gaming history or associated memory of a prospective player and/or at the prospective player appliance as a result of monitoring that the prospective player is participating while an instance of said game is active or otherwise.

According to some embodiments, a notification state may instigate or cause initiation of a subsequent action. For example, virtual representations may be updated, a credit field may be updated and/or a field indicating that a prospective player has purchased a real ticket.

According to some embodiments, the notification state may at least partially be dependent, step from or be associated with the virtual gaming history of one or more prospective users.

According to some embodiments, A GPES may include a compulsive identification module which may send an alarm if suspected compulsive behavior of the prospective player is detected. Furthermore, a regulation logic may trigger a warning if a state which is non-compliant with a pre-defined regulation is identified.

According to some embodiments, a management module may provide an interface for management tasks associated with the system.

Turning now to FIG. 1, depicted is a symbolic representation of an exemplary relationship between a RRG and a GPES according to some embodiments of the present invention. A game such as RRG 102 may be carried out or played periodically, at predetermined times, once a week, once a month, once a day or otherwise. Exemplary RRG 102 may be number, card and/or combination game such as traditional lotto, keno games, fortune, joker and trump, instant lotto and rolling and progressive jackpots and more. The game or draw machines associated with RRG 102 may be physical draw machines, electronic simulations, interactive player channels, flexible draw frequencies and formats and more. Tickets for RRG 102 may be purchased or obtained by RRG players such as lottery players 104 at sales points such as ticket sales points 106. Ticket sales points 106 may be physical or electronic, online or offline points of sale or otherwise. Lottery players 104 may buy tickets for one or more game instances, tickets may be bought with money or other means having a monetary value.

According to some embodiments, a distribution center such as winnings distribution 108 may receive a game instance result and identify the winners with the winning tickets within the lottery players 104. A game instance and/or a result notification of a RRG 102 may be relayed or broadcast to an extension system such as GPES 110. The game instance and/or result notification may be transmitted or relayed to GPES 110 by different mediums such as broadcasting tower 112, internet 114, landlines, and direct, wireless or indirect transmissions. GPES 110 may substantially in real-time render on a prospective player's 116 computing appliance 120 virtual representations mirroring game events from the game instance. The virtual representations mirroring game events may include associated content, associated virtual game and instances and offers to prospective players 116.

According to some embodiments, prospective players 116 may access GPES 110 via internet, cellular, Bluetooth or other wired or wireless communication modes. Prospective players 116 may access GPES 110 via computing appliances 120 which may be a computer, TV, laptop, cellular phone, smart phone, PDS and more. The computing appliances 120 may include a dedicated application stored on the computing device or accessed remotely by the computing device.

Figure 2:
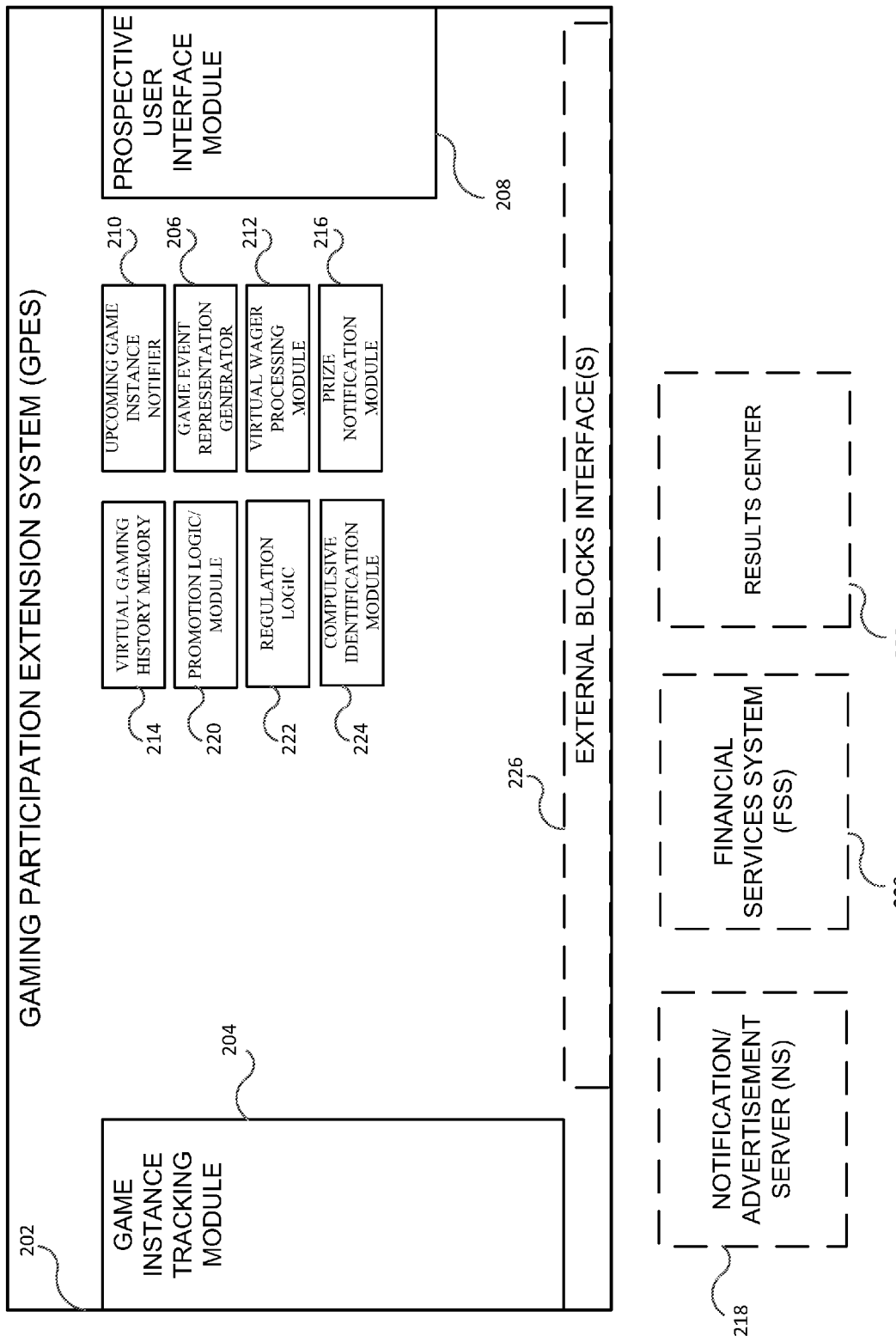
FIG. 2 shows a functional block diagram of a GPES according to embodiments of present invention.

Turning now to FIG. 2, depicted is a functional block diagram of a GPES, such as GPES 202, according to some embodiments of present invention. GPES 202 may include a tracking module such as game instance tracking module 204 which may track one or more instances of a game. The game instances may be received as a game signal at game instance tracking module 204 directly or indirectly via internet, broadcast, RF, cellular or other transmissions associated with a RRG. Game instance tracking module 204 may identify when a game starts, when a game ends, when a result notification is received and more. Game instance tracking module 204 may buffer the game signal. Game instance tracking module 204 may turn on at a predetermined time, for example, when a game instance is expected.

According to some embodiments, GPES 202, may include a generator such as game event representation generator 206 which may generate a virtual representation mirroring the game events which may include: adapting the received game signal received at game instance tracking module 204, to one or more formats suitable to the prospective player computing devices, adding information/content to the received signal such as instances and offers, advertisements, secondary content, additional options, interactive options and more.

According to some embodiments, GPES 202 may include an interface module such as prospective player interface module 208 which may relay virtual representations mirroring game events to one or more prospective players. The prospective player interface module may receive mirrored game events directly from game instance tracking module 204 or from game event representation generator 206. Prospective player interface module 208 may relay the mirrored game events to one or more prospective players via wired or wireless internet, cellular, RF, video or audio means or otherwise.

According to some embodiments, prospective player interface module 208 may further, receive information from one or more prospective players via wired or wireless internet, cellular, RF, video or audio means or otherwise. Information received from a prospective player may include: user information (such as identification, location and more), control signals (such as confirming receipt of a signal, modem data and more), virtual wagers, and more.

According to some embodiments, GPES 202 may include a game notifier such as upcoming game instance notifier 210 which may signal to game instance tracking module 204 that a game is expected and/or signal to a prospective player computing appliance (for example, via prospective player interface module 208) that a game is about to start, reminders toward upcoming events (such as draws expected in the next 24 hours) and more. The signal to a prospective player computing appliance and/or an application running on the computing appliance may include a reminder or a power-on signal and more. Game instance notifier 210 may receive information from a RRG such as prizes, draw dates and times and real time information such as live draw numbers.

According to some embodiments, GPES 202 may include a wager processing module such as virtual wager processing module 212 which may receive virtual wagers from prospective players via their computing devices through the prospective player interface module 208. The virtual wagers may be stored in virtual wager processing module 212 or in an associated memory.

According to some embodiments, GPES 202 may include a history memory such as virtual gaming history memory 214 which may store, analyze and/or process information, data, and statistics associated with specific prospective players as well as general or mass statistical information. For example, gaming history 214 may store virtual wager statistics, responsiveness to a specific offer and more. Gaming history 214 may further allocate or update fields associated with a prospective player based on the received information, for example a prospective user may be allocated credit based on participation or game results and more, and the credits assigned to a prospective player may further be stored in gaming history 214. Gaming history 214 may further update or store information associated with a prospective player subsequently buying or obtaining a real wager or monetary wager.

According to some embodiments, GPES 202 may include a prize notifier such as prize notification module 216 which may carry out or manage identification of a winner within a group of prospective players and initiate a notification to the winner and/or the group of prospective players regarding winner identity. Prize notification module 216 may receive a signal identifying and end of game instance and/or information associated with game ending/game results. These signals may be received from game instance tracking module 204 or from an external information center such as results center 230. Prize notification module 216 may identify who of the prospective players associated with the virtual wagers are associated with the results of the game and may interact with virtual wager processing module 212 and/or virtual gaming history memory 214 to analyze, obtain or process this information. If necessary, for example if a game is defined so that there is only a single winner but multiple virtual wagers are associated with the game results, prize notification module 216 may initiate a secondary raffle. Prize notification module 216 may initiate notification of winner directly and/or publicly for example via prospective player interface module 208 and/or an external notification server such as notification/advertisement server (NS) 218.

According to some embodiments, GPES 202 may include a promotion logic such as promotion module 220 which may be configured to identify fulfillment of predefined situations in which a promotional message should be sent (such as a notification state) and initiate sending of a promotional message to one or more prospective players' computing appliance either via prospective player interface module 208 or via NS 218. Promotion module 220 may be associated with virtual gaming history memory 214, virtual wager processing module 212 and/or prize notification module 216 and more to receive and process information to assist in identifying which promotional message should be sent.

According to some embodiments, a promotion logic module may receive information associated with effectiveness of previous promotion, message or promotion and/or may track statistics relating to the number or percentage of prospective users receiving promotions who become actual players, thereby determining or estimating a conversion efficiency of a given promotion or promotion type. The promotion logic module may thereby send current promotions based also on conversion efficiency of previous promotions.

According to some embodiments, GPES 202 may include a regulation logic such as regulation logic module 222 which may receive and store game associated regulations including legal limitations (such as permitted locations from which a virtual wager is allowed to be sent, legal age of prospective player, laws and regulations governing mobile transactions and more). Regulation logic module 222 may further initiate or trigger an abort/disable/error indication to a prospective player's computing appliance if a non-permitted or illegal situation is detected (for example, a wager is executed in a non-permitted area such as out of state borders or otherwise).

According to some embodiments, GPES 202 may include a compulsive identification logic such as compulsive identification module 224 which may receive a gaming history (real or virtual) associated with a specific prospective player (for example, from the virtual gaming history memory 214 or from virtual wager processing module 212) and signal or flag if suspected compulsive or inappropriate behavior associated with gambling is detected. Compulsive identification module 224 may further cause GPES 202 to send an abort or disable notification to a prospective player computing appliance, disable an application stored on the computing appliance, notify authorities and more.

According to some embodiments, GPES 202 may include, or be associated with, NS 218. NS 218 may receive information from GPES 202, for example from virtual gaming history memory 214, prize notification module 216, upcoming game instance notifier 210 and more. Communication between GPES 202 and NS 218 may be carried out via an interface such as external blocks interface 226. NS 218 may notify/alert regarding upcoming game instances and/or won prizes and may further send promotional messages to computing appliances of prospective players. NS 218 may send promotional messages in several mediums associated with the computing appliances such as internet, cellular, RF, Bluetooth and more, the messages may be video, audio, wireless and more.

According to some embodiments, GPES 202 may include or be associated with results center 230 which may act as an interface with a game center to receive/send information such as upcoming game times, winners, winning results, prize amount to winning players and more. Communication between GPES 202 and NS 218 may be carried out via external blocks interface 226.

According to some embodiments, GPES 202 may include or be associated with a Financial Services System (FSS) such as FSS 228 which may receive real wagers from prospective player interface module 208 after a wager is validated by GPES 202 for example with regulation logic 222 and/or compulsive identification module 224. Communication between GPES 202 and NS 218 may be carried out via external blocks interface 226.

Figure 3:
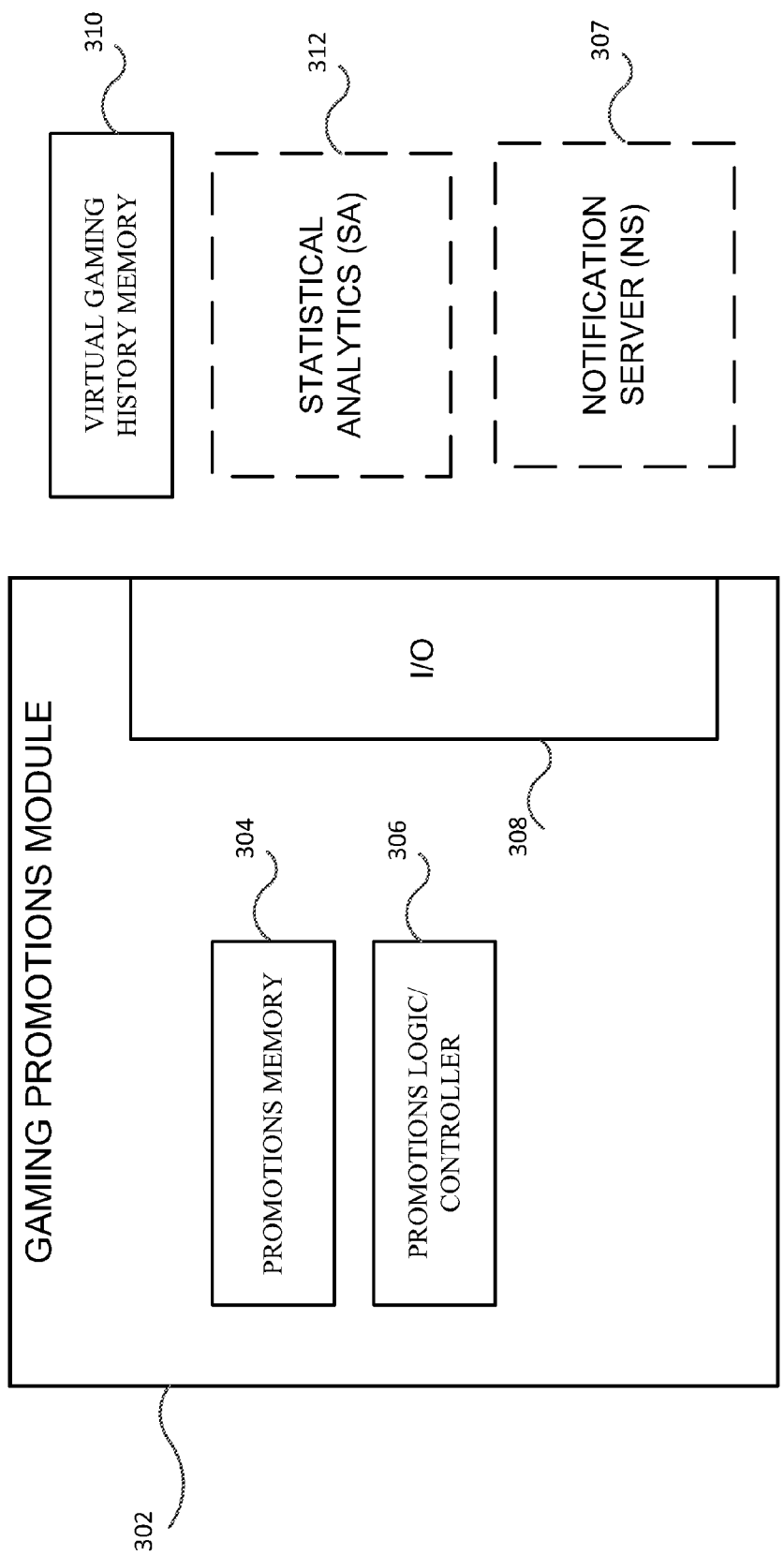
FIG. 3 shows a functional block diagram of an exemplary gaming promotions module according to embodiments of the present invention.

Turning now to FIG. 3 depicted is a functional block diagram of an exemplary promotions module such as gaming promotions module 302 according to embodiments of the present invention. It is understood that gaming promotions module 302 may be substantially interchangeable with or similar to promotion logic module 220 of FIG. 2 and may be embedded or included within a GPES similar to GPES 202 of FIG. 2.

According to some embodiments, gaming promotions module 302 may send prospective player specific messages which depend on a specific prospective player's history and associated information or wide-range/broad messages to be sent to a group with the prospective players or all of the prospective players.

According to some embodiments, gaming promotions module 302 may identify fulfillment of pre-defined situations in which a promotional message should be sent and initiate sending of a promotional message accordingly. Gaming promotions module 302 may include a memory such as promotions memory 304 which may store promotional messages, codes and/or identifiers associated with promotional messages and/or predefined states or conditions. The content of promotions memory 304 can be updated, changed, deleted and/or added to. Gaming promotions module 302 may further include promotions logic such as promotions controller 306 which may identify when a predefined state or condition occurs and signals a notification server such as NS 307 the message to be sent or the code or state to be sent and the identity of the prospective player to receive the message. Gaming promotions module 302 may define a sub-group of prospective players to which a specific message should be sent, or may send a message to a specific prospective player or to all prospective players or otherwise. Gaming promotions module 302 may further define/design delivery policies and schedules for message delivery.

According to some embodiments, the message to be sent by gaming promotions module 302 may be an SMS message, notification and ad banners, email or otherwise. Gaming promotions module 302 may support inform consent data management to enable prospective players to unsubscribe from any of the GPES' lists.

According to some embodiments, gaming promotions module 302 may be configured to, may enable or may support: managing groups of recipients, managing and storing message/advertisement content, managing message delivery policies, managing message tasks, exporting mailing lists and message tasks, generating message reports (which message was sent, which messages are stored and more) and more.

According to some embodiments, gaming promotions module 302 may interact with additional blocks of the GPES and/or external blocks via an interface such as I/O 308. Promotions controller 306 may receive data/information with which to identify a predefined state from a history memory such as virtual gaming history memory 310 (which is understood to be substantially the same as virtual gaming history memory 214 of FIG. 2), a statistical analytics (SA) server such as SA 312 to provide statistical information associated with internet users not necessarily associated with a specific prospective player and more. SA 312 may be external or internal to a GPES associated with gaming promotions module 302.

According to some embodiments, gaming promotions module 302 may interact and access the GPES (for example the virtual gaming history memory) in order to search for prospective players who fit a desired profile. These prospective players may be grouped and stored as unique value mailing lists that can be used later to deliver special value messages. This process search profiles to find prospective players according to predefined parameters. The parameters can be updated. Searching and downloading information can be executed either offline or in batch mode.

Figure 4:
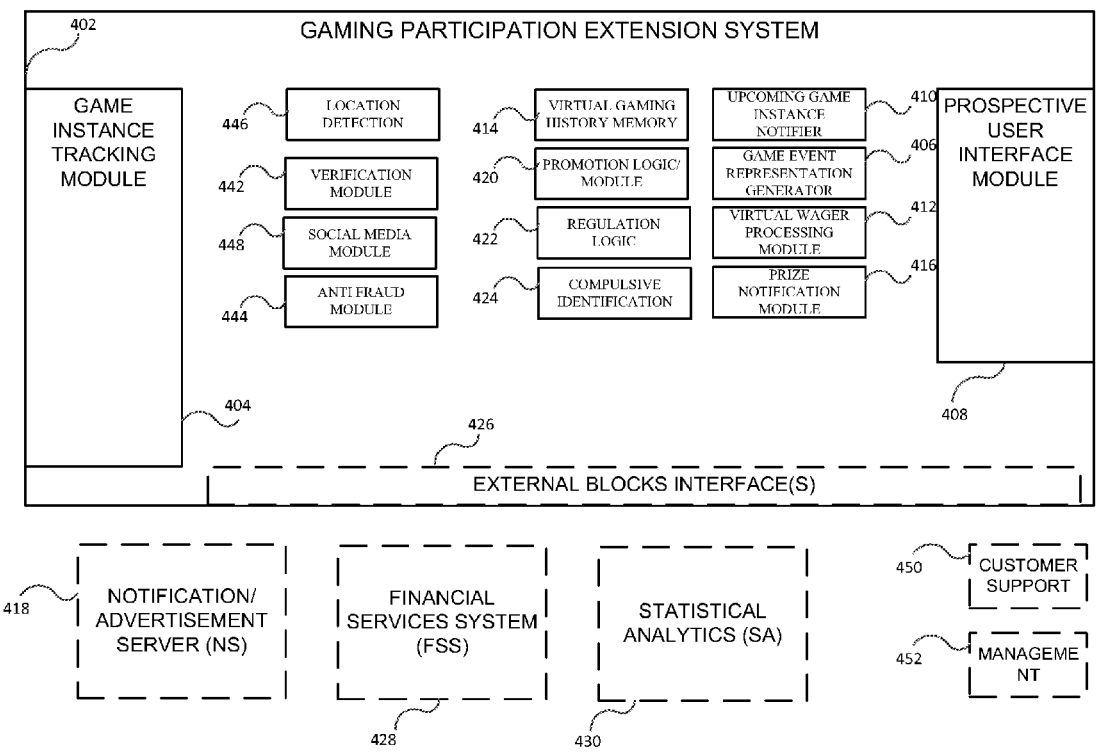
FIG. 4 shows a functional block diagram of an exemplary GPES according to embodiments of present invention.

Turning now to FIG. 4, depicted is a functional block diagram of an exemplary GPES such as GPES 402 according to embodiments of present invention. It is understood that elements 404-430 are substantially similar to elements 204-230 of FIG. 2 (accordingly).

According to some embodiments, GPES 402 may further include a verification module such as verification module 442 which may support a user identification process based on a prospective player's identification parameters (for example computing appliance identity such as a mobile telephone number or IP address or otherwise) as well as a user name and password defined by the prospective player. Verification module 442 may track players and may be able to identify suspected compulsive players and send appropriate alerts. Verification module 442 may also identify players who might be trying to manipulate the system and, therefore, can assist in preventing fraud.

According to some embodiments, GPES 402 may further include an anti-fraud module such as anti-fraud module 444 which may identify and assist in preventing fraudulent money transactions. Furthermore, anti-fraud module 444 may carry-out/implement an anti-fraud option on FSS 428. Anti-fraud module 444 may include a set of rules that diagnose and identify suspicious activity in real time in conjunction with external information from other related databases such as FSS 428 and financial institutions, and the Lottery system. External providers (such as mobile, internet providers etc.) with their own anti-fraud server can communicate with the GPES 402 to further improve the ability of the GPES 402 to prevent fraudulent transactions.

According to some embodiments, GPES 402 may further include a locator such as location detection 446 which may enables GPES 402 to know where a prospective player is physically, assist regulation logic 422 in prohibiting prospective players who are out of a predefined area (such as country, state etc.) and may further be used to supply statistics and information to promotion logic module 420. Location detection 446 may receive information from the prospective player's computing appliance such as GPS information, WIFI address and more.

According to some embodiments, GPES 402 may further include a social module such as social media module 448 which may enable prospective players who are registered on a social media (such as Facebook, Google+, LinkedIn and more) a simple interface on their computing appliance that may enable them to connect with other registered prospective players.

Registered prospective players may be able to communicate with non-users, thereby, encouraging friends and contacts to also participate in a RRG.

Social media module 448 may offers positive reinforcement to encourage prospective players to continue playing via the prospective player application (PPA). Prospective players may be able to select different types of reinforcements that can be customized by the RRG. These special offers may be important. Spending more time in the application means that players might be paying more attention to the RRG products available and to the live-draw shows.

According to some embodiments, social media module 448 may enable accessing general mail messages, enable publishing on a social media network an indication on the number of virtual wagers a prospective player has submitted, provide credits for participating in different game activities, enable notification of important events on a social media network, provide increased results in spreading the PPA and may further be utilized as information provided to virtual gaming history memory 414. Social media module 448 may be designed to encourage more interest, awareness, and stickiness on the part of the registered prospective players and to reward them for "spreading the word" to their social media network.

According to some embodiments, GPES 402 may further be associated with a customer support system which may be internal or external to GPES 402 such as customer support system 450 which may support prospective players accessing GPES 402. Customer support system 450 may be securely accessible on the front side by a RRG customer services and securely accessible on the back side by the GPES 402.

According to some embodiments, customer support system 450 may support/enable/allow access and management of prospective player's accounts and game history, allowing prospective players to get answers for common questions related to their games, resolve real-time game issues (errors), and manage their user accounts. Customer Support System 450 may be restricted to current and recent history only. Optionally, Customer support related to games that are older than recent history may be escalated to a higher level of support. Examples of issues that customer support system 450 may assist in: the Registration process (Support issues/errors relating to registration; Enable prospective players to complete a full registration cycle via customer services, Enable prospective players to update registration details such as address, billing data, etc.), support issues/errors relating to account management, Validate that registration information is correct, Enable prospective players to manage their access keys and passwords (Retrieve lost keys, Reset keys, Lock or restrict accounts), Query game history (When did a prospective player play and in which type of game, What was the virtual bet amount, Did the prospective player win or lose, Did the prospective player collect the prize and if so where and when did I receive the prize).

According to some embodiments, customer support system 450 may enables access to the GPES in order to query data and perform certain operations. This interface between GPES and prospective player enables communication with several GPES modules, such as the registration service and virtual gaming history memory 414.

According to some embodiments, GPES 402 may communicate with or be associated with a management system such as management module 452 which may be external or embedded within GPES 402. Management module 452 may enable system administrators' management and carrying out of administrative tasks by GPES 402. Management module 452 may further provide and interface for management and administrative tasks with the RRG.

According to some embodiments, management module 452 may enable monitoring, and running of various management functions in order to ensure that GPES 402 is functioning properly. Some of the management functions may be unique to GPES 402 or relate only to GPES 402 while others are general management tasks that are implemented using common external software packages and tools. Both types of management functions and more may be integrated into management module 452 to allow GPES 402 administrators to implement these functions from a single access point (for example, the interface of the management module 452 application).

According to some embodiments, management module 452 may discover an occurrence of a predefined state and may notify the system administrator with standard alerts either on management module 452 or via an email associated with the system administrator. The RRG organization may be able to monitor and control different aspects of the RRG via the management system and may further enable the RRG organization to monitor and manage several different game instances simultaneously.

Management module 452 may provide: RRG management, RRG management interface, access and management of accounting and ledgers, content management, Ticket sale tracking (virtual and real tickets), User management, regulation management, security management, error and logger activity, aces to auditing systems, compulsive identification module 424 management, responsible gaming control and monitoring, sales and distribution statistics, statistics associated with winning calculation, technical management system, system configuration, management of verification module 442 and more.

Figure 5:
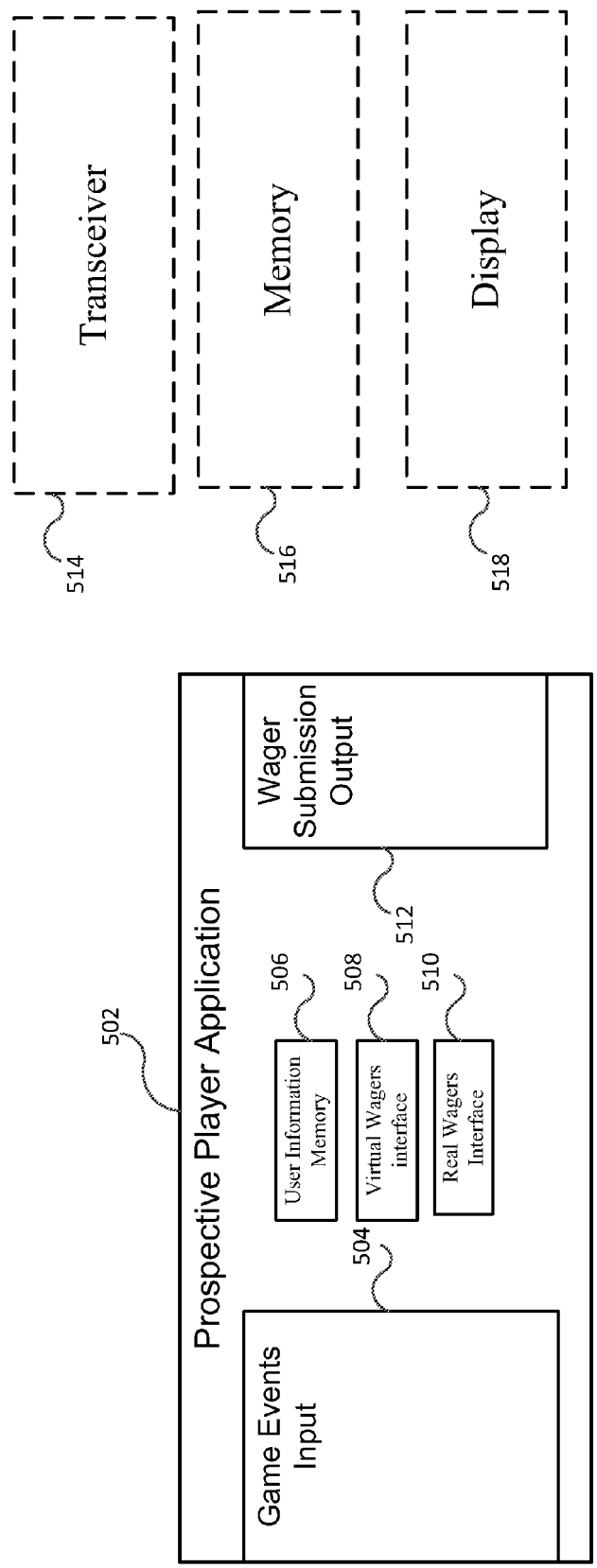
FIG. 5 shows a functional block diagram of a prospective player application and exemplary associated blocks according to embodiments of present invention.

Turning now to FIG. 5 depicted is a functional block diagram of a prospective player application (PPA) such as PPA 502 and exemplary associated blocks according to embodiments of the present invention. PPA 502 may be stored on or accessed by a prospective player's computing appliance. PPA 502 may include an interface such as game event input 504 configured to receive in substantially real-time virtual representation mirroring game events transmitted by a GPES such as GPES 202 of FIG. 2. PPA 502 may further include user information storage such as user information memory 506 which may store information such as user identity, computing appliance details (IP address, access code, current location, communication mode such as cellular, internet and more). PPA 502 may further include a user interface such as virtual wagers interface 508 to receive information associated with virtual wagers and a user interface such as real wager interface 510 to receive information associated with real wagers. PPA 502 may further include an interface such as Wager submission output 512 to relay virtual and/or real wagers from virtual wagers interface 508 and real wagers interface 510 as well as user information from user information memory 506 to a GPES.

According to some embodiments, PPA 502 may be associated or interactive with additional blocks of a prospective player's computing appliance such as transceiver 514, computing appliance memory 516 and/or display 518.

Figure 6:
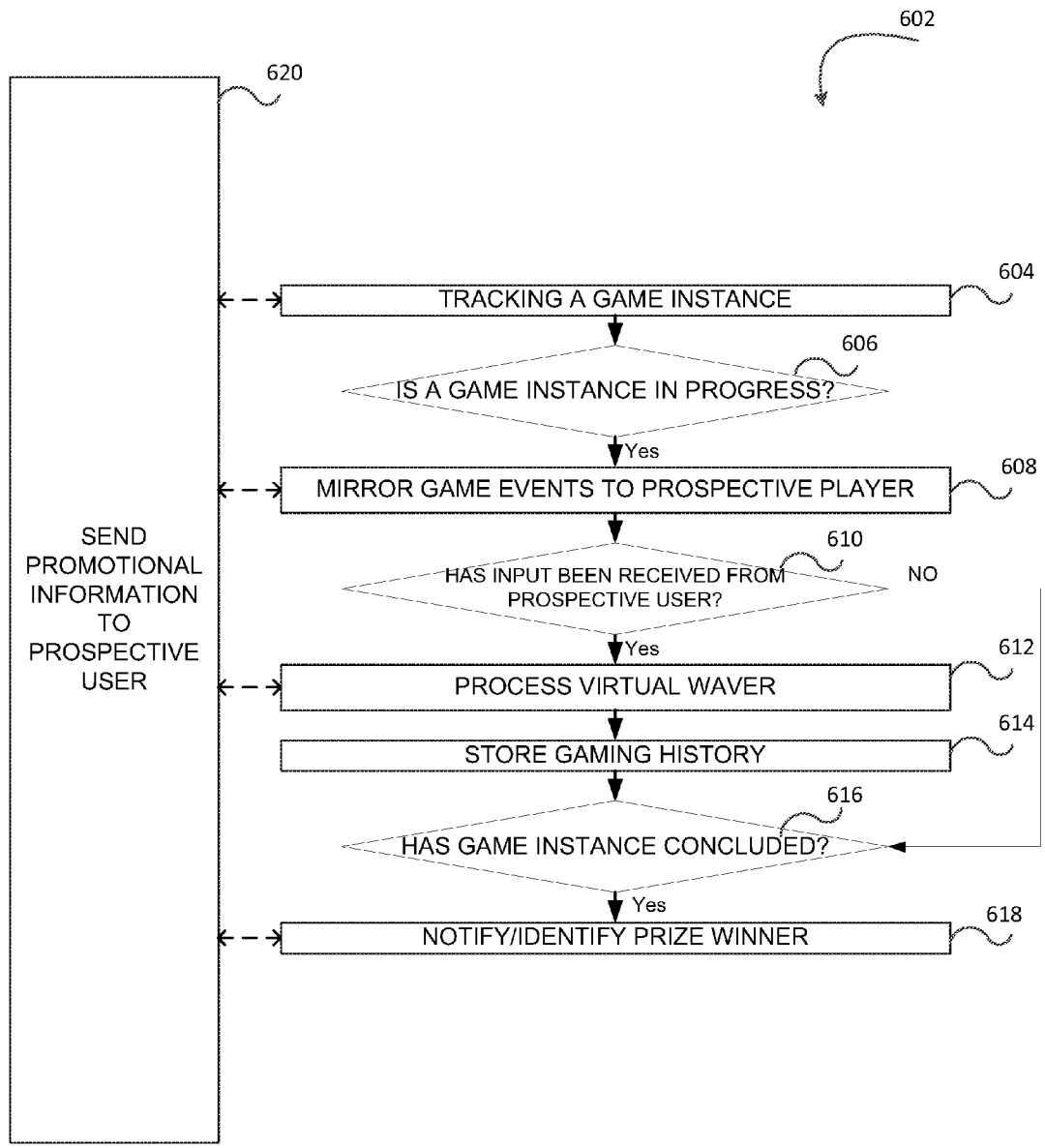
FIG. 6 is a flow chart including exemplary steps of exemplary algorithms implemented by a GPES according to embodiments of the present invention.

Turning now to FIG. 6, shown is a flow chart (602) including exemplary steps of exemplary algorithms implemented by a GPES according to embodiments of the present invention. The GPES may await initiation or track a game instance (step 604). If a game instance is in progress (step 606), the GPES may mirror the game events to one or more prospective players or users (step 608). While the game is being mirrored to the prospective player the GPES may also receive input from a prospective player (step 610), this may also be carried out when a game instance is not in progress (for example, before a game initiates). The GPES may process received virtual wagers (step 612), this may also be carried out when a game instance is not in progress. The GPES may further store one or more prospective player's gaming history (step 614) which includes such information as a prospective player's identity, virtual wager history and more. When a game instance has concluded (step 616) a prize winner may be identified and notified (step 618) notification may be sent to the winner as well as a group or all of the prospective players. GPES may also send promotion information to one or more prospective players (step 620) which may be carried out: before a game initiates (for example to send a reminder that a game is about to start), while a game instance is active/in progress (for example, to promote participate in the RRG) or when a game instance has concluded (for example, to notify winner identity, update regarding future games or promote real participation in a RRG) and more.

Figure 7:
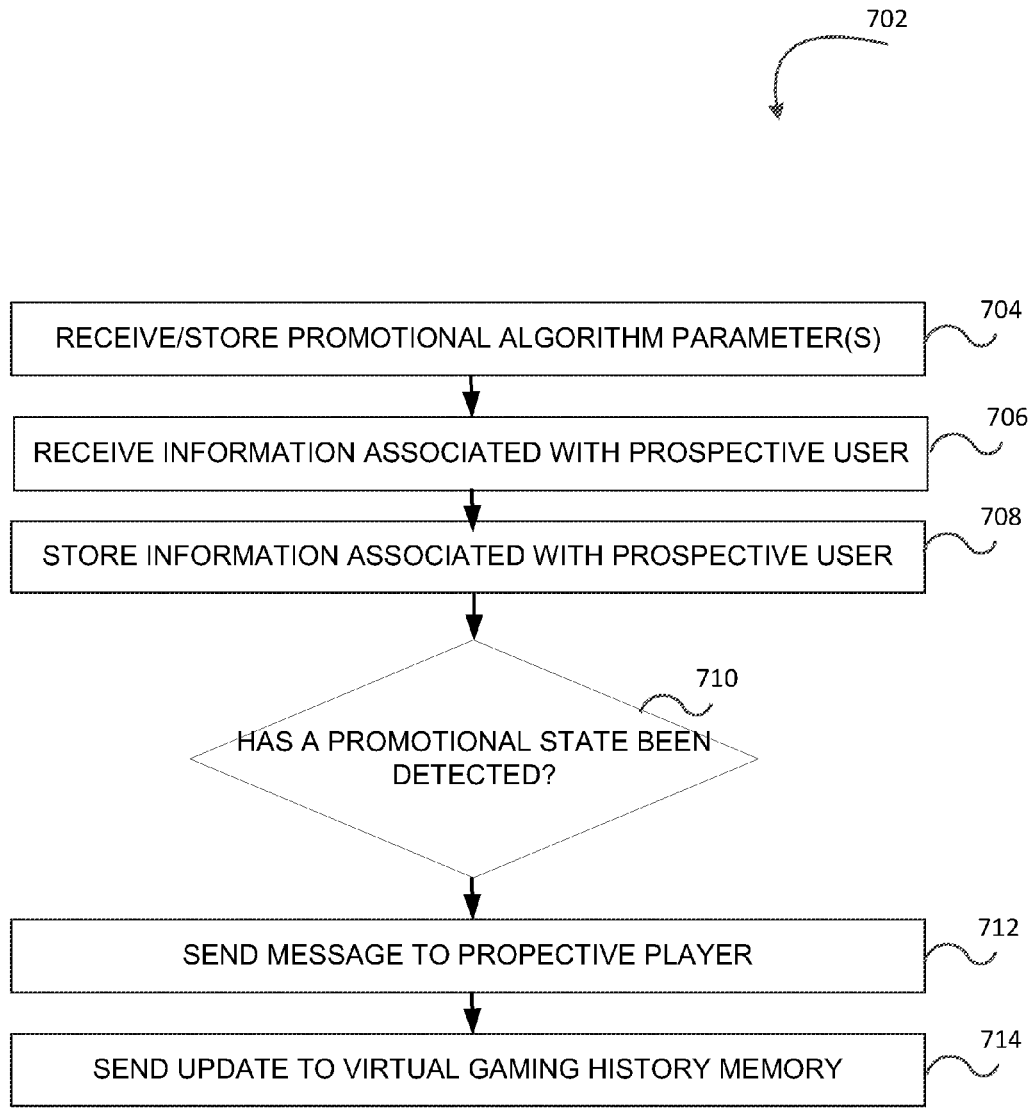
FIG. 7 is a flow chart including exemplary steps of exemplary algorithms implemented by a gaming promotions module according to some embodiments.

Turning now to FIG. 7, shown is a flow chart (702) including exemplary steps of exemplary algorithms implemented by a gaming promotions module according to some embodiments of the invention. A gaming promotions module may receive and/or store promotional algorithm parameters (step 704) for example, predefined states in which specific messages should be sent. The gaming promotions module may receive information associated with one or more prospective players (step 706) for example, gaming history, contact information and more, and may store some or all of the received information (step 708). If a promotional algorithm parameter has been met (step 710) for example if compliance with a predefined state is detected, the gaming promotions module may sent a message to a prospective player (step 712). Optionally, the gaming promotions module may utilize an external server such as a NS server to send the message in which case the gaming promotions module may send the predefined state, the message content, associated data, prospective player contact information and more to the NS to assist in the message being sent. The gaming promotions module may send an update to a virtual gaming history memory (step 714) to save history of messages sent with correlation to which users they were sent. According to some embodiments, step 704 may include, sending the following exemplary messages/notifications: invitation to buy a free virtual ticket, invitation to buy a real ticket, confirmation of a received message, a free virtual ticket, a free real ticket, confirmation of credit achieved by a prospective user, confirmation of registration process, reward resulting in achieved credit, reward resulting in consistent playing, confirmation of use of an application, confirmation of use of a social game.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A game participation extension system for extending, broadening and promoting gaming participation in a regularly recurring game, said system comprising:
   a game instance tracking module comprising processing circuitry adapted to monitor one or more instances of said regularly recurring game and detect, extract and record parameters of each of the one or more instances on a functionally associated first digital memory, wherein said regularly recurring game involves wagers of monetary funds;
   a virtual game generator comprising processing circuitry functionally associated with the first digital memory and adapted to, in real-time, transform the recorded parameters into image data of virtual representations mirroring game events from the tracked game instance and to transmit the virtual representations to a computing appliance of a prospective player to be displayed to the prospective player upon a display of the computing appliance;
   a virtual wager module comprising processing circuitry adapted to communicate with the computing appliance and receive from the computing appliance virtual wagers, relating to the one or more instances of said regularly recurring game, made by the prospective player through the computing appliance, wherein a virtual wager is defined as a wager that does not involve real monetary funds and cannot result in a loss of real money to the prospective player; and
   wherein said system awards winners of virtual wagers a prize distinct from prizes awarded to participators in the regularly recurring game; and
   a prospective player monitoring unit functionally associated with a second digital memory and adapted to store in said second digital memory profiles and virtual gaming histories of prospective players;
   a promotion module comprising processing circuitry adapted to monitor profiles and virtual gaming histories of prospective players stored in said second digital memory, compare parameters of the monitored profiles and virtual gaming histories to a set of dynamic criteria and, upon the profile and virtual gaming history of a given prospective player meeting the set of dynamic criteria, send a promotional offer relating to the regularly recurring game, to the given prospective player.

2. The system according to claim 1, wherein said system is further configured to monitor that a prospective player is participating while an instance of said game is active.

3. The system according to claim 1, wherein said promotion module is further configured to detect that a notification state occurs and initiate a predefined notification be sent to one or more computing appliances.

4. The system according to claim 3 wherein the notification state is associated with identification of a winner of a game.

5. The system according to claim 4, wherein the predefined notification is sent to the winner of a game and one or more prospective players.

6. The system according to claim 3, wherein said predefined notification is selected from the group consisting of: an invitation to buy a free virtual ticket, an invitation to buy a real ticket, a confirmation of a received message, a free virtual ticket, a free real ticket, a confirmation of credit achieved by a prospective user, a confirmation of a registration process, a reward resulting from achieved credit, a reward resulting from consistent playing, a confirmation of use of an application, a confirmation of use of a social game.

7. The system according to claim 3, wherein said virtual wager module is further configured to accept virtual wagers, relating to a given instance of the regularly recurring game, from prospective players, after the given instance of the regularly recurring game has commenced.

8. The system according to claim 2, wherein virtual credit is stored in the virtual gaming history of a prospective player as a result of monitoring that the prospective player is participating while an instance of said game is active.

9. The system according to claim 3, wherein said notification state is further configured to initiate an action selected from the group consisting of: updating said virtual representations, updating a credit field and updating a field indicating that a prospective player has purchased a real ticket.

10. The system according to claim 3, wherein the notification state is associated with the one or more instances of said regularly recurring game.

11. The system according to claim 2, further comprising a compulsive identification module configured to send an alarm if suspected compulsive behavior of the prospective player is detected.

12. The system according to claim 2, further comprising a regulation logic to trigger a warning if a state which is non-compliant with a pre-defined regulation is identified.

13. The system according to claim 1, further comprising a management module configured to provide an interface for management tasks associated with the system.

14. A method for extending, broadening and promoting gaming participation in a regularly recurring game, said method comprising:
- monitoring, by use of first processing circuitry communicatively coupled to a computational platform associated with the regularly recurring game, one or more instances of said regularly recurring game, wherein said regularly recurring game involves wagers of monetary funds;
- detecting, extracting and recording parameters of each of the one or more instances on a first digital memory functionally associated with the first processing circuitry;
- transforming, by a virtual game generator comprising processing circuitry functionally associated with the first digital memory and communicatively coupled to computing appliances of prospective players, in real-time, the recorded parameters into image data of virtual representations mirroring game events from the tracked game instance;
- transmitting the virtual representations to a computing appliance of a prospective player to be displayed to the prospective player upon a display of the computing appliance;
- accepting, by a virtual wager module comprising processing circuitry functionally associated with the first digital memory and communicatively coupled to computing appliances of prospective players, virtual wagers, relating to the one or more instances of said regularly recurring game, made by the prospective player through the computing appliance, wherein a virtual wager is defined as a wager that does not involve real monetary funds and cannot result in a loss of real money to the prospective player;
- awarding winners of virtual wagers a prize distinct from prizes awarded to participators in the regularly recurring game; and
- storing, by a prospective player monitoring unit comprising processing circuitry functionally associated with a second digital memory, profiles and virtual gaming histories of prospective players in the second digital memory;
- monitoring, by a promotion module comprising processing circuitry communicatively coupled to the second digital memory and the computing appliances of prospective players, profiles and virtual gaming histories of prospective players stored in the second digital memory;
- comparing, by the promotion module, parameters of the monitored profiles and virtual gaming histories to a set of dynamic criteria;
- upon the profile and virtual gaming history of a given prospective player meeting the set of dynamic criteria, sending a promotional offer relating to the regularly recurring game, to the given prospective player, based on a profile of the prospective player and a virtual gaming history of the prospective player.

15. The method according to claim 14, further comprising monitoring that a prospective player is participating while an instance of said game is active.

16. The method according to claim 14, further comprising detecting that a notification state occurs and initiating a pre-defined notification to be sent to one or more computing appliances.

17. The method according to claim 16 wherein the notification state is associated with identification of a winner of a game.

18. The method according to claim 16, wherein the notification state is associated with the virtual gaming history of one or more prospective players.

19. The method according to claim 16, further comprising accepting virtual wagers, relating to a given instance of the regularly recurring game, from prospective players, after the given instance of the regularly recurring game has commenced.

20. The method according to claim 16, further comprising identifying a state which is non-compliant with a pre-defined regulation and triggering a warning.

\* \* \* \* \*